J. T. BOND.
OIL STRAINER.
APPLICATION FILED JUNE 3, 1910.
970,982.
Patented Sept. 20, 1910.
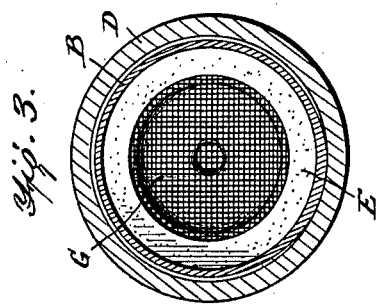
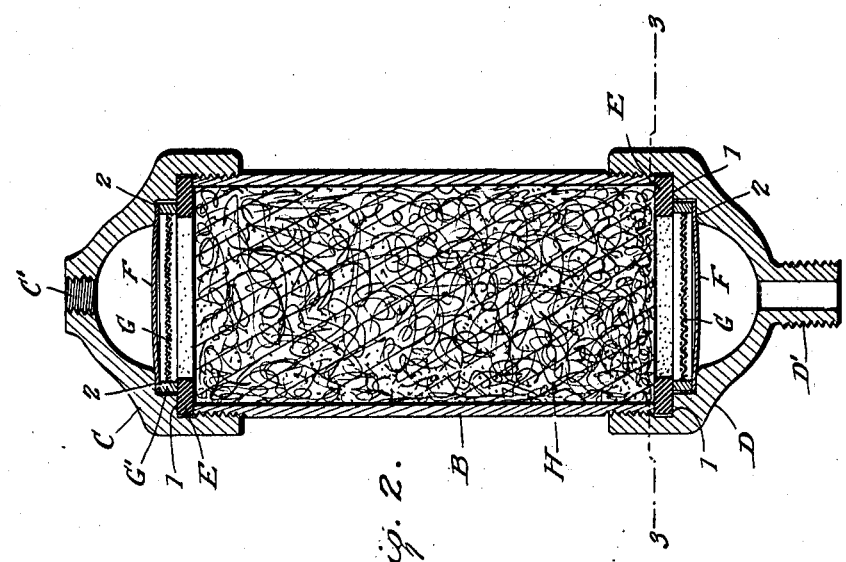
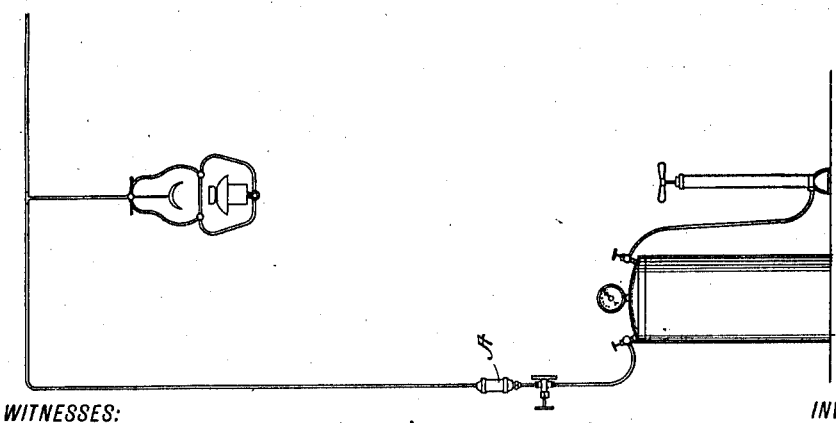
WITNESSES:
L. H. Schmidt
Perry B. Turpin.
INVENTOR
JOHN T. BOND,
BY Munn & Co.
ATTORNEYS

UNITED STATES PATENT OFFICE.

JOHN T. BOND, OF PALATKA, FLORIDA.

OIL-STRAINER.

970,982.     Specification of Letters Patent.     Patented Sept. 20, 1910.

Application filed June 3, 1910. Serial No. 564,890.

*To all whom it may concern:*

Be it known that I, JOHN T. BOND, a citizen of the United States, and a resident of Palatka, in the county of Putnam and State of Florida, have invented certain new and useful Improvements in Oil-Strainers, of which the following is a specification.

This invention is an improvement in filters and especially in oil filters or filters designed for use in cleansing and purifying gasoline, kerosene, and other hydro-carbons, and the invention has for an object to provide a novel construction which will remove the sediment and other impurities and will stop the passage of water with the hydro-carbon so the hydro-carbon will be delivered to the point for use free of sediment and the like and without water so it will operate effectively for the desired purpose.

The invention consists in certain novel constructions and combinations of parts as will be hereinafter described and claimed.

In the drawing Figure 1 is an elevation of my invention as in use. Fig. 2 is a vertical longitudinal section of the filter. Fig. 3 is a cross section on about line 3—3 of Fig. 2.

In Fig. 1, I show the improved device A in connection with a system wherein compressed air may be operated to produce a gas in connection with the hydro-carbon for illuminating purposes.

The filter A comprises a tubular body B which may be of brass or other suitable material and is threaded at its ends for the reception of the caps C and D, the former having a threaded opening at C' and the latter having a threaded nipple D' for connection with pipes, the cap pieces being otherwise alike. These cap pieces, it will be noticed, are provided with internal annular shoulders 1 and 2, which form seats respectively for the gaskets E and chamois strainers F. The chamois strainers are pressed against their seats by the frame G' of the wire cloth screens G, and the said frames G' are pressed upon by the gaskets E, as shown, so that when the caps are turned tightly home from their respective ends of the body B, the gaskets will form a tight joint between the body B and the caps and the said gaskets projecting inwardly over the shoulders 2 may operate to secure the wire cloth screens and through them the chamois strainers, as best shown in Fig. 2 of the drawing.

The body B is filled with any suitable filtering material H, such as cotton, wool or the like.

In operation, the chamois skin strainer will serve to remove water from the hydrocarbon and the wire cloth screens will operate to remove any coarse impurities, while the finer impurities and sediment and the like will be stopped by the filtering material H.

It will be noticed that the strainer can be conveniently applied for use by making the connections at C' and D' and can also be readily taken down for renewal of any of the parts or for other repairs, as may be necessary.

I claim:

1. The combination in a filter of a body portion, a cap screwed thereon and having an internal shoulder opposite the end of the body and a second shoulder of less diameter than the first and between the same and the end of the cap, a screen and strainer fitting said smaller shoulder and a gasket on the larger shoulder and betwen the same and the body of the filter and extending inwardly to overlie and secure the screen, substantially as set forth.

2. The combination in a filter with the body portion and a cap applied thereto and shouldered forming a seat for a gasket and having a shoulder beyond said first shoulder, straining devices seated against said second shoulder and a gasket held against the first shoulder and projecting inwardly to secure the straining devices upon the second shoulder, substantially as set forth.

JOHN T. BOND.

Witnesses:
R. J. HANCOCK,
H. HUTCHINSON, Jr.